(No Model.) 7 Sheets—Sheet 1.

J. GIBBONS.
COOKING APPARATUS.

No. 462,921. Patented Nov. 10, 1891.

Fig. 1.

WITNESSES:
INVENTOR: J. Gibbons
BY Munn & Co.
ATTORNEYS (No Model.) 7 Sheets—Sheet 2.

J. GIBBONS.
COOKING APPARATUS.

No. 462,921. Patented Nov. 10, 1891.

WITNESSES:
J. E. Caswell
C. Sedgwick

INVENTOR:
J. Gibbons
BY
Munn & Co.
ATTORNEYS (No Model.) 7 Sheets—Sheet 3.

J. GIBBONS.
COOKING APPARATUS.

No. 462,921. Patented Nov. 10, 1891.

WITNESSES:
J. A. Criswell
C. Sedgwick

INVENTOR:
J. Gibbons
Munn & Co.
ATTORNEYS (No Model.) 7 Sheets—Sheet 4.

J. GIBBONS.
COOKING APPARATUS.

No. 462,921. Patented Nov. 10, 1891.

WITNESSES:
J. A. E. Cuswell
C. Sedgwick

INVENTOR:
J. Gibbons
BY Munn & Co.
ATTORNEYS (No Model.) 7 Sheets—Sheet 5.

J. GIBBONS.
COOKING APPARATUS.

No. 462,921. Patented Nov. 10, 1891.

WITNESSES:
J. A. Criswell
C. Sedgwick

INVENTOR:
J. Gibbons
BY
Munn & Co.
ATTORNEYS (No Model.) 7 Sheets—Sheet 6.

J. GIBBONS.
COOKING APPARATUS.

No. 462,921. Patented Nov. 10, 1891.

WITNESSES:
J. E. Caswell
C. Sedgwick

INVENTOR:
J. Gibbons
BY Munn & Co.
ATTORNEYS

(No Model.) 7 Sheets—Sheet 7.

J. GIBBONS.
COOKING APPARATUS.

No. 462,921. Patented Nov. 10, 1891.

WITNESSES:
J. C. Criswell
E. Sedgwick

INVENTOR:
J. Gibbons
BY
Munn & Co.
ATTORNEYS

UNITED STATES PATENT OFFICE.

JAMES GIBBONS, OF JERSEY CITY, NEW JERSEY, ASSIGNOR TO THE GIBBONS SUPERHEATING COMPANY, OF SAME PLACE.

COOKING APPARATUS.

SPECIFICATION forming part of Letters Patent No. 462,921, dated November 10, 1891.

Application filed May 27, 1890. Serial No. 353,375. (No model.)

*To all whom it may concern:*

Be it known that I, JAMES GIBBONS, of Jersey City, in the county of Hudson and State of New Jersey, have invented a new and Improved Cooking Apparatus, of which the following is a full, clear, and exact description.

My invention has for its object to provide a simple, effective, compact, and self-contained apparatus intended more especially for cooking substances by the aid of fluid fuel or gas, and adapted for broiling, boiling, or baking food-supplies, and to do all styles of cooking, either simultaneously or alone, at pleasure, the whole apparatus being quite as, if not more, economical in operation than ordinary stoves or ranges in which coal or wood fuel is used.

The invention consists in certain novel features of construction and combinations of parts of the cooking apparatus, all as hereinafter described and claimed.

Reference is to be had to the accompanying drawings, forming a part of this specification, in which similar letters and figures of reference indicate corresponding parts in all the views.

Fig. 2$^a$ is a detail side view of the upper portion of one side wall of the broiling-chamber and adjacent parts. Fig. 3$^a$ is a detail front vertical sectional view of the upper part of the boiler, taken on the same lines.

My improved cooking apparatus in its complete form as a general cooking range or structure, intended more especially for ordinary household uses, is shown in and will first be described with more particular reference to Figs. 1 to 11, inclusive, of the drawings. This household apparatus comprises an improved broiler A, capable of simultaneously cooking both sides of steaks, chops, fowl, or fish; two side-bracket chambers B B, adapted for cooking substances by either broiling or frying them and for heating water, and a baking-oven C, set on top of the broiler and deriving its heat therefrom. The broiler A is probably the most important part of the self-contained cooking apparatus, and I will first particularly describe it, as follows:

I make the broiler with an outer casing D, preferably having a general rectangular shape, and within which are accommodated or formed the two opposing contiguous fire-chambers E E, separated by a comparatively narrow chamber F, which is the broiling-chamber, and in which are sustained centrally one or more broiler-grids G, which hold the meat, fowl, or fish to be broiled between the opposing heat-radiating or cooking walls of the two fire-chambers. This casing D is provided at the front of the broiling-chamber F with a door or doors, preferably a pair of doors $d\ d$, which are shown too narrow to entirely close the front of the chamber, so as to allow the handle of the grid G to project between them. In practice, however, the doors $d\ d$ will be sufficiently wide to wholly close the front of the broiling-chamber to allow it to be more quickly heated, and when the grid G is placed or hung in the chamber to cook substances held by it, the doors will simply be closed as far as possible or until they strike the grid-handle. At its rear wall the casing D is provided with a door $d'$, adapted to close a passage $f$, made through the casing at the rear of the broiling-chamber F and opening to said chamber.

Figure 1:
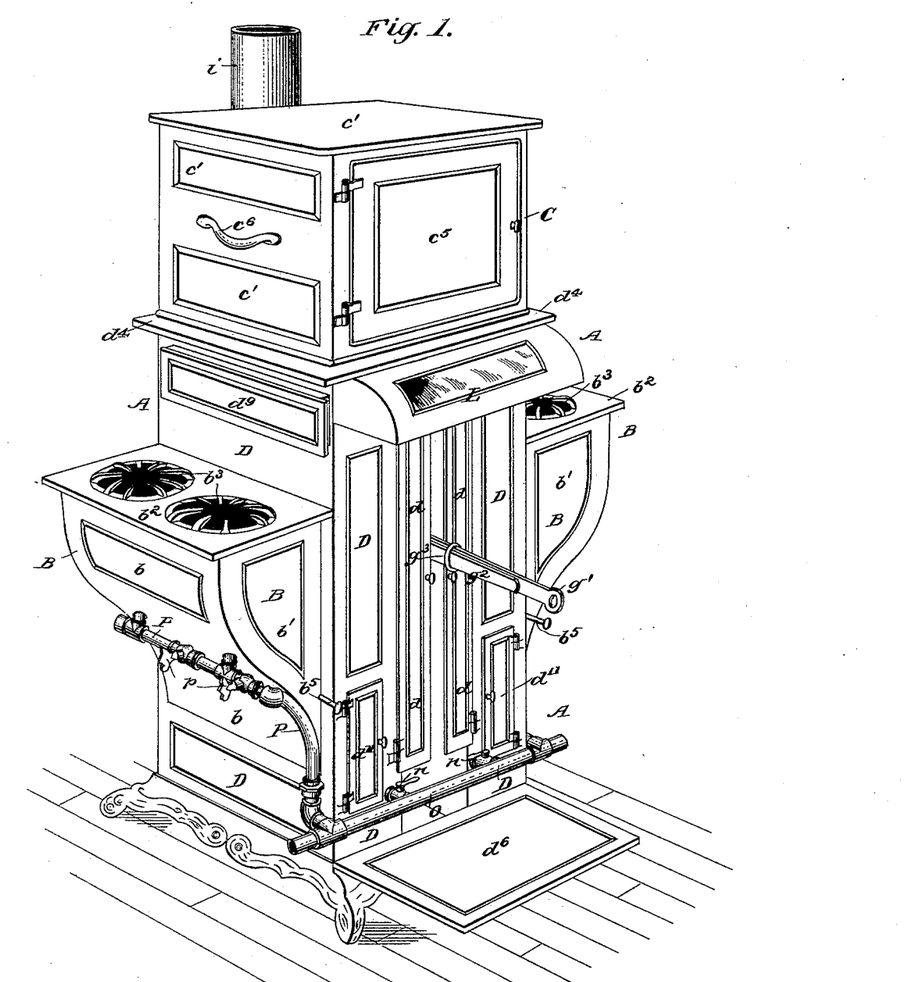
Figure 1 is a perspective view of my improved cooking apparatus.
Figure 2:
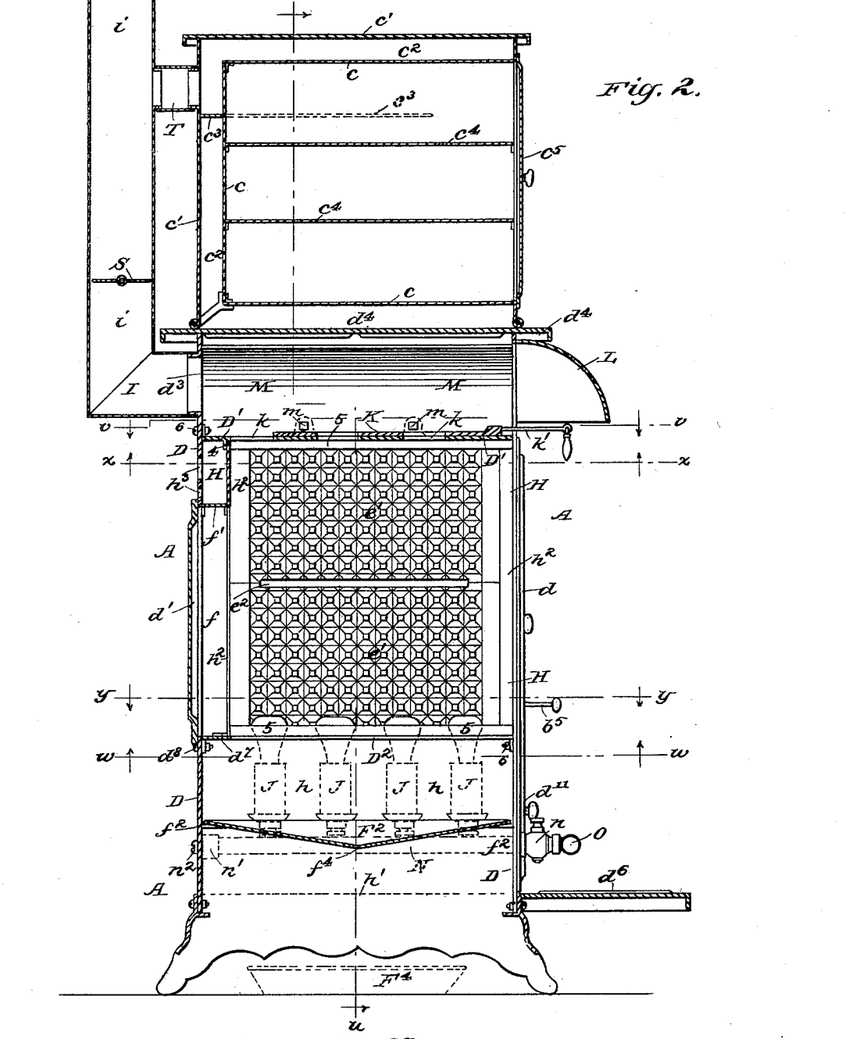
Fig. 2 is a vertical sectional side view taken on the line $t\ t$ in Fig. 3, but with the grid and adjacent hot-wall removed.
Figure 2A:
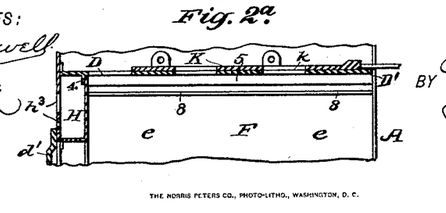
Figure 3:
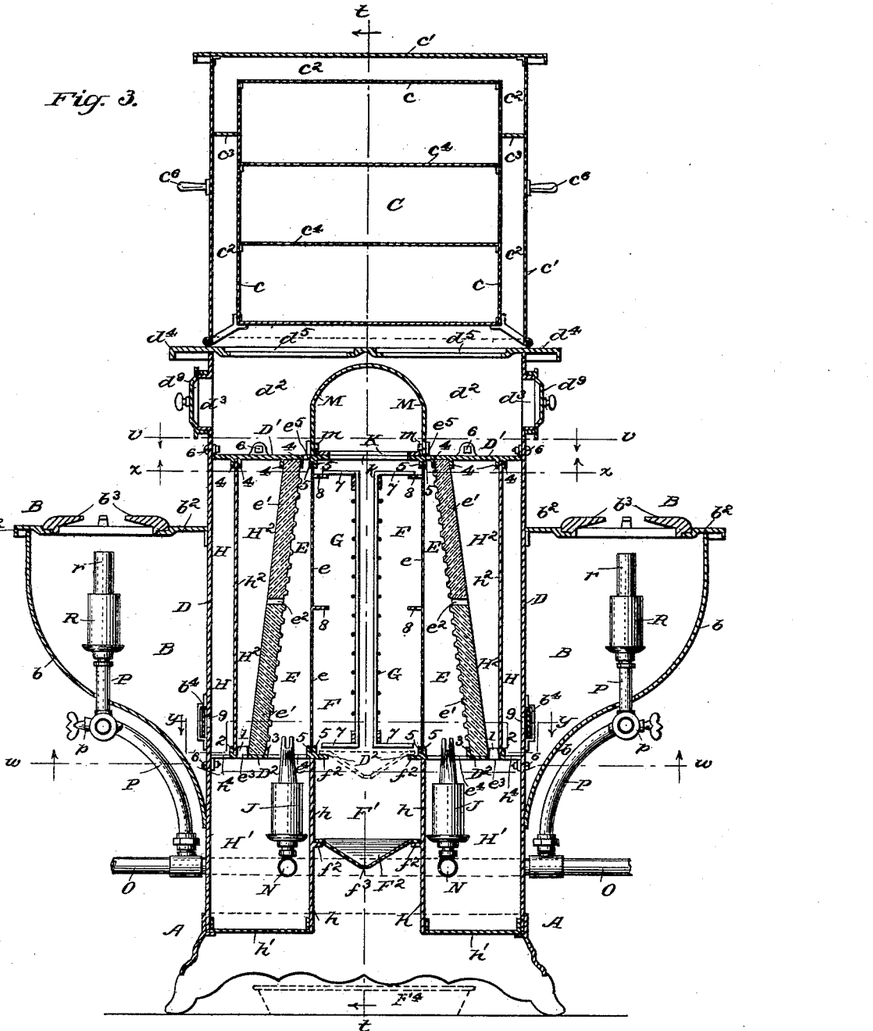
Fig. 3 is a rear vertical sectional view taken on the lines $u\ u$ in Figs. 2, 4, and 5.
Figure 3A:
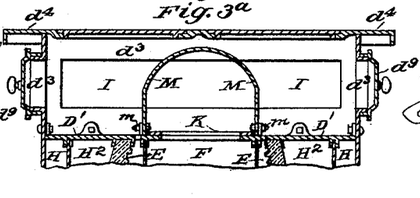

Figs. 2 and 3 of the drawings show more clearly that the two opposing contiguous fire-chambers E E are formed between upper and lower plates $D'\ D^2$, which locates the fire-chambers about at or a little above the central portion of the casing D, and in the preferred construction provides above the top plate $D'$, the fire-chambers E E, and the adjacent air-superheating chamber H an upper waste-product and fume-outlet chamber $d^2$, which has a comparatively large opening $d^3$, to which an outlet-box I is connected. An ordinary stove-pipe $i$, fitted to this box, carries the waste hot products and fumes to a chimney or draft-pipe. The top plate $d^4$ of the broiler is fitted to the top of the casing D, and is provided with a series of holes $d^5$, to which ordinary stove covers or lids will be applied, as shown in Fig. 3ª of the drawings, when the baking-oven C is not used on the broiler.

The broiling-chamber proper F may be said to extend vertically between the plates $D'\ D^2$ and across between the opposing and readily-removable cooking-walls $e\ e$ of the two contiguous fire-chambers E E, which I have made, preferably, to slide in grooves or guides on the top and bottom walls of the fire-chambers, as hereinafter more fully explained. I have fitted below these walls $e\ e$ a pair of vertical plates $h\ h$, which are preferably fixed and form a lower extension $F'$ to the broiling-chamber and in which a drip-receiving pan or funnel is placed. When I make the broiler with a forwardly-extending plate $d^6$, cast with the leg-base of the casing or frame, as shown in Figs. 1, 2, 4, and 7 of the drawings, I provide the broiling-chamber or its lower extension with a separate drip-receiving pan or funnel $F^2$, which loosely fits within the chamber and is simply laid or slid to place therein upon opposite side lips or flanges $f^2 f^2$, cast or formed on the side plates $h\ h$, as shown in full lines in Fig. 3 of the drawings. This removable and adjustable drip tray or funnel, by confining the heat within the broiling-chamber proper, facilitates quick heating up of the cooking-walls, and, by conserving their heat, promotes economical working of the apparatus. Should it be desirable to further contract the size of the broiling-chamber to more closely confine the heat radiated from the walls $e\ e$ around and upon the substance being cooked in the grid G, sustained between said walls, it is only necessary to draw out the drip pan or funnel $F^2$ from the flanges $f^2$, on which it rests, and slide it in over higher flanges $f^2$, formed on the opposite side walls $h$ or formed by inwardly-extending edges of the bottom plates $D^2\ D^2$ of the fire-chambers. Numerous flanges $f^2$ may be provided on the walls $h\ h$ to allow several different vertical adjustments of the drip-pan to contract the broiling-chamber to any desired extent. The pan $F^2$ may be made to catch and retain the drip-fat falling from the meat or other substance being broiled; but I prefer to make the pan with a bottom sloping from all sides to a central hole $f^3$, through which the drippings fall into another pan $F^4$, placed below the broiling-chamber.

Figure 16:
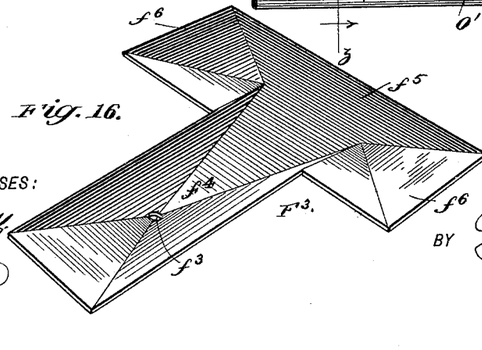
Fig. 16 is a perspective view of the modified form of drip pan or funnel.

It may in practice be preferable to dispense with the base front ledge $d^6$ on the broiler-casing and combine this ledge or its equivalent drip-catching pan with the drip-pan located in the broiling-chamber. This preferred form of drip-pan $F^3$ is shown applied to the broiler in Figs. 12 and 13 of the drawings and is shown detached in perspective view and in larger scale in Fig. 16. The pan $F^3$ has an inner part $f^4$, fitting within the broiling-chamber like the drip-pan $F^2$ above described; but the pan $F^3$ also has a front portion $f^5$, which extends beyond the front of the broiler casing or frame D, to catch the drip and conduct it to the body part $f^4$ of the pan and through the hole $f^3$ therein to the lower drip-pan $F^4$. The pan $F^3$ also preferably has lateral extensions $f^6\ f^6$ from its front portion $f^5$, and these parts $f^6$ may reach to the opposite sides of the broiler-casing. The parts $f^5 f^6$ all slope to the pan portion $f^4$ to drain into it. I at present prefer to make the pan $F^3$ of sheet metal and re-enforce it by wrought-metal bars or plates fastened at its under side to enable it to safely sustain the weight of the grid G and its contents when rested upon it in using the broiler. As the weight of the grid upon the front extension of the pan $F^3$ would be liable to tip it upward at its back or inner part, I prevent this by providing the opposite side walls of the broiling-chamber or its lower extension $F'$ with pairs of rib or flange guides $f^7 f^7$, between which the opposite side edges of the body part $f^4$ of the drip-pan are retained. A number of these pairs of guides $f^7$ are provided to allow the entire pan to be set higher or lower or to be adjusted vertically to contract the size of the broiling-chamber, as desired, and in substantially the same manner as when the smaller drip-pan F² is employed.

The plates or walls $h$ $h$, with the bottom plates $h'$ $h'$ and the outer casing D, form below the plates D² downward extensions H' H' of the air-superheating chamber H above named. A vertical wall or partition $h^2$ is fitted around three sides of the broiler-casing D, between the plates D' D², but stands off or inward a few inches more or less from the casing and whereby the chamber H is made to extend around at all four sides of the casing, except where said casing is open at the front of the broiling-chamber and where narrow partition-plates $f'$ at top and both sides of the rear casing-opening $f$, above described, cross the air-superheating chamber. It will be noticed that the two higher side portions of the air-superheating chamber H, which range immediately behind the two fire-chambers, have communication with each other through the upper narrower portion of said chamber H, which is over the rear opening $f$ of the broiling-chamber. The vertical wall or partition $h^2$ is preferred in practice, as it not only provides for an air-superheating chamber H, which may be continuous and extends around three sides of each of the fire-chambers, but it also forms immediately behind the inwardly-leaning rear wall $e'$ of each fire-chamber a very efficient air-superheating chamber H², which may be termed the "auxiliary air-superheating chamber," and has direct communication with the fire-chamber E, through a passage $e^2$, or it may be a series of holes or openings made through the fire-chamber wall $e'$, and also communicates with the main air-superheating chamber H' H' through slots or passages $e^3$, made through the lower plate or wall D². This wall or partition $h^2$ is not essential to the effective operation of the broiler, as will be understood from Fig. 19 of the drawings, which shows a modification in which this wall is not used, as hereinafter more fully explained. I prefer to employ a rear wall $h^2$, forming an auxiliary air-superheating chamber H², behind each fire-chamber E, because some of the atmospheric air first admitted to the chamber H through a series of holes $h^3$ made in the upper part of the casing D, and preferably in its rear wall or side, after passing downward through the narrower upper part H of the air-superheating chamber and thence through marginal openings $h^4$ in the outer side and front and rear parts of the plate D², will enter the larger lower part H' of the air-superheating chamber and pass thence through the slots or passages $e^3$ in the plate D² to the auxiliary chamber H², wherein the temperature of the air will be greatly increased before it can pass through the rear-wall opening $e^2$ into the fire-chamber at a place or places beyond the points of ignition or tips of a series of burners J, which are preferably an improved type of Bunsen burner, and flame into the fire-chamber from below. The burner-tips preferably project a little into the fire-chamber through an opening $e^4$, made in the bottom plate D² and through which opening the main volume of superheated air from the chamber H H' passes upward into the fire-chamber to maintain combustion at the burners. The object of the auxiliary supply of highly-superheated air to the fire-chamber E through its rear-wall opening $e^2$ is to assure complete combustion of any unconsumed gaseous products which may perchance escape into the fire-chamber beyond the flaming-points of the burners, and whereby a practically perfect combustion of the fluid fuel is maintained in the two contiguous fire-chambers of the broiler.

Figures 6, 7:
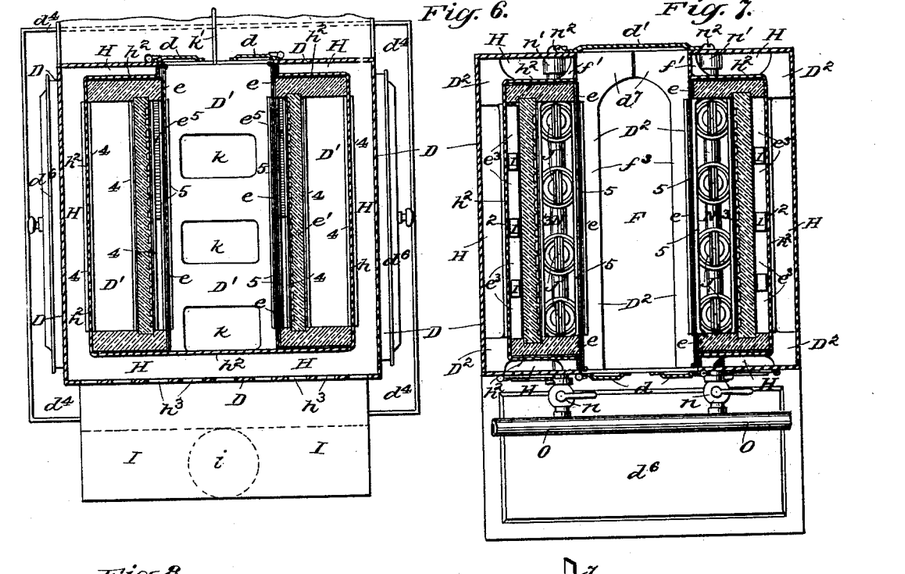
Fig. 6 is an inverted or bottom plan view, in section, on the lines $x\ x$ in Figs. 2 and 3, and is more especially intended to show the under side of the top plate of the two contiguous fire-chambers and the broiling-chamber of the apparatus.
Fig. 7 is a plan view in section on the lines $y\ y$ in Figs. 2 and 3, and shows more particularly a top view of the bottom plates of the fire and broiling chambers.

Figs. 6 and 7 of the drawings most clearly show forwardly-bent edge or end portions of the inner wall $h^2$ to close the front parts of the air-superheating chambers H H next the two cooking-walls $e$ $e$ and the front doors $d$ $d$ of the broiling-chamber. It will be understood that these two air-superheating chambers H H need not be in communication with each other, as each fire-chamber may have its own air-superheating chamber within its outer casing, and the rear opening $f$ of the casing may also be dispensed with at pleasure.

Figure 5:
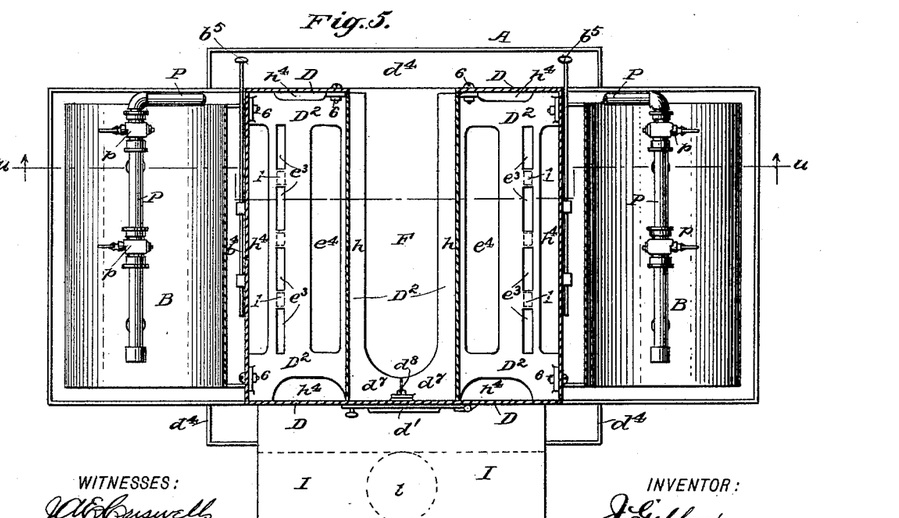
Fig. 5 is a bottom plan view in section on the lines $w\ w$ in Figs. 2 and 3.

Fig. 5 of the drawings most clearly shows, in bottom plan view, the construction of the lower plates D² D² of the fire-chambers E E, and Fig. 7 shows a top plan view of these plates. Both of these plates D² may be cast in one piece or be formed of one plate of sheet metal; but I prefer to cast each plate D² D² separately and to project their rear-end portions $d^7$ $d^7$ across the lower part of the broiling-chamber F to form the bottom wall of the rear opening $f$ of this chamber and also to allow one fastening stove bolt or screw $d^8$ to be passed through two overlapping lugs, one formed on each of the parts $d^7$ of the two plates, into the stove body or casing. (See Fig. 5 of the drawings.)

I provide in a simple and efficient manner for retaining the walls of each fire-chamber E in proper positions relatively with each other and the casing and the plates D' D², which support the fire-chambers, by casting or forming on the opposing faces of these plates a series of lugs and flanges. A series of lugs 1, rising from the plates D² between the auxiliary superheated air-inlets $e^3$, separate the rear walls $e'$ of the fire-chambers from the adjacent walls or partitions $h^2$, and a rib or flange 2, behind each plate $h^2$, holds it in position between the fire-chamber wall $e'$ and the adjacent wall of the casing, while a rib or flange 3, which projects at the face of the wall $e'$, holds it to the spacing-lugs 1 and in proper relation to the heating or cooking wall $e$ of the fire-chamber. Two pairs of ribs or flanges 4 4, pendent from the under side of the upper plate D', maintain the tops of the wall $e'$ and partition $h^2$ in proper position relatively with each other and with the casing D and cooking-wall $e$, and two pairs of ribs or flanges 5 5, cast or provided on the opposing faces of the upper and lower plates D' D², form between them grooves or slideways into which the effective cooking-walls $e$ $e$ of the two opposing fire-chambers E E are fitted loosely, so as to be withdrawn or removed at pleasure for either repair or renewal of them or to facilitate examination of the interior of the fire-chamber of the broiler. I specially claim these removable or renewable cooking walls or plates in the sense that they may be readily removed at will without impairing the integrity of the casing structure of the apparatus.

Figure 4:
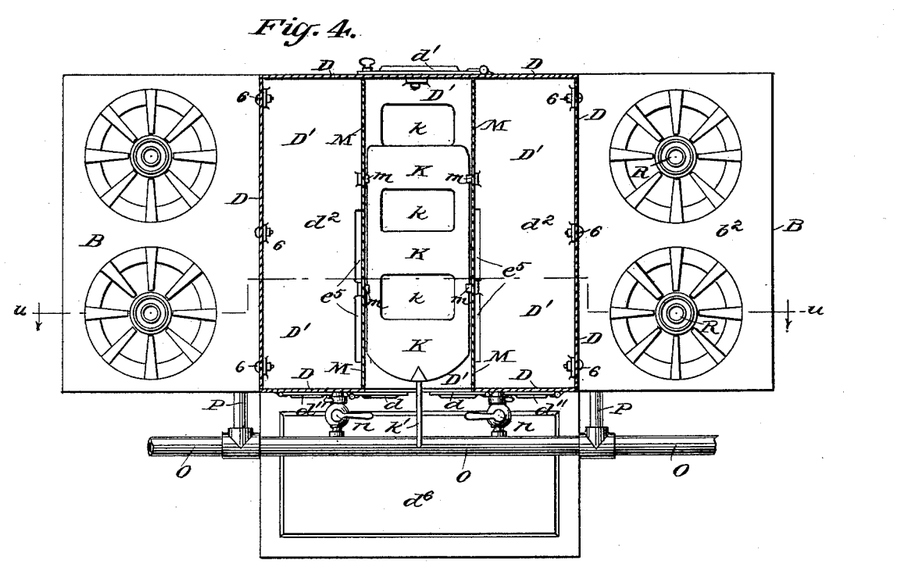
Fig. 4 is a top plan view in horizontal section on the lines $v\ v$ in Figs. 2 and 3.

Reverse sides or faces of the upper plate D', which is preferably cast or is otherwise produced in one piece, are shown in Figs. 4 and 6 of the drawings, Fig. 4 being a top view, and Fig. 6 a bottom plan view, of said plate and adjacent parts. This plate D' is provided at its central portion above the broiling-chamber with a series of openings $k$, preferably three, and over which and preferably on top of the plate is fitted a slide-damper K, adapted to open and close the openings $k$, and having a suitable stem or handle $k'$ projecting through the front of the casing D immediately below a fume-collecting hood L, which preferably has a mica panel and is suitably fitted to the top of the broiler and extends, preferably, for its whole width. On top of the upper plate D', I place within the top hot-product chamber $d^2$ of the broiler an interior cap or hood M, which is open at both ends and extends clear across the broiler from front to rear and incloses within it the damper K and the fume-escape openings $k$ of the plate D', which said damper controls. The front end of the cap or hood M extends to or through the front of the casing D and communicates freely with the interior of the fume-collecting hood L, and the back open end of the cap opens directly to the outlet $d^3$ I to the draft-flue, and whereby the rising fumes or smoke caught in or by the hood will pass directly through the cap or the chamber or passage formed within it to the smoke-flue, and the fumes rising directly from the broiling-chamber F through the openings $k$ of the plate D' into the cap M will also pass along within the cap directly to the smoke-flue and without escaping into the upper hot-product chamber $d^2$ of the broiler. The damper K is held down to place on the plate D' by the heads of the bolts or screws $m$, by which the cap or interior hood M is fastened to lugs which rise from the plate D'. (See Fig. 4.) By adjusting the damper K the escape of hot fumes from the top of the broiling-chamber may be controlled and the temperature of the chamber be regulated at will and independently of or in conjunction with the opening or adjustment of the front or rear doors $d$ $d'$ of said chamber.

It will be noticed that the broiler-outlet I to the smoke-flue is considerably wider than the fume-outlet chamber formed within the cap M, which is only about as wide as the broiling-chamber F below it. Hence there is direct communication between the hot-product chamber $d^2$ and the outlet at opposite outer sides of the cap, as will be understood from Fig. 3ª of the drawings. This direct communication between the hot-product chamber and outlet assures direct passage or escape to the outlet I of hot products from each of the fire-chambers E through contracted or somewhat small openings $e^5$ made in the upper plate D', between the cooking-wall $e$ and rear wall $e'$ of each of the fire-chambers. These openings $e^5$ are intentionally made toward or near the forward edge or part of the plate D', in order to compel the very hot products escaping through them to the chamber $d^2$ and the outlet to traverse as far as possible the front parts of the opposing contiguous cooking-plates $e$ $e$ of the fire-chambers to prevent the air admitted at the more or less open front doors $d$ $d$ of the broiling-chamber F from unduly cooling down the front or outer portions of these walls $e$ $e$. In other words, by placing the hot-product outlets $e^5$ from the fire-chambers E E toward the front of the casing the entire front portions of the cooking walls or plates $e$ $e$ of the opposing fire-chambers will be heated to the same degree as their rear parts, should the front doors $d$ $d$ of the broiling-chamber be left wide open while cooking substances in said chamber.

The arrangement of the interior cap or hood M over the broiling-chamber F and the location of the fire-chamber outlets $e^5$ outside of this cap effects such complete separation of the fumes from the broiling-chamber and the hot products from the two opposing fire-chambers that there is practically no chance of the hot products from the fire-chambers finding their way into the broiling-chamber to injuriously affect the flavor of substances being cooked therein.

I prefer to provide the casing D at the hot-product chamber $d^2$ with an opening $d^3$ at the rear and at each side. Each of these outlets $d^3$ preferably has a surrounding flange or collar to which the outlet box or pipe funnel I is adapted, thus allowing connection of the smoke-pipe to the rear or to either side of the broiler-casing, as may be most convenient, and also allowing two or more of the complete broilers to be coupled together under one common top cooking-plate and discharge their fumes and hot products into one common smoke-pipe, as will be hereinafter more fully explained. Caps $d^9$ are provided to cover those outlets $d^3$ not connected to the smoke pipe or flue or not connected by a coupling-pipe $d^{10}$, hereinafter referred to. I prefer to mold the upper and lower plates D' D² in cast-iron and provide them with lugs or flanges, through which bolts or screws 6 are passed to fasten the plates to the casing or frame D of the broiler, these bolts 6 being used in connection with the above-named bolt $d^8$ in the plates D².

Figures 8, 9, 10, 11:
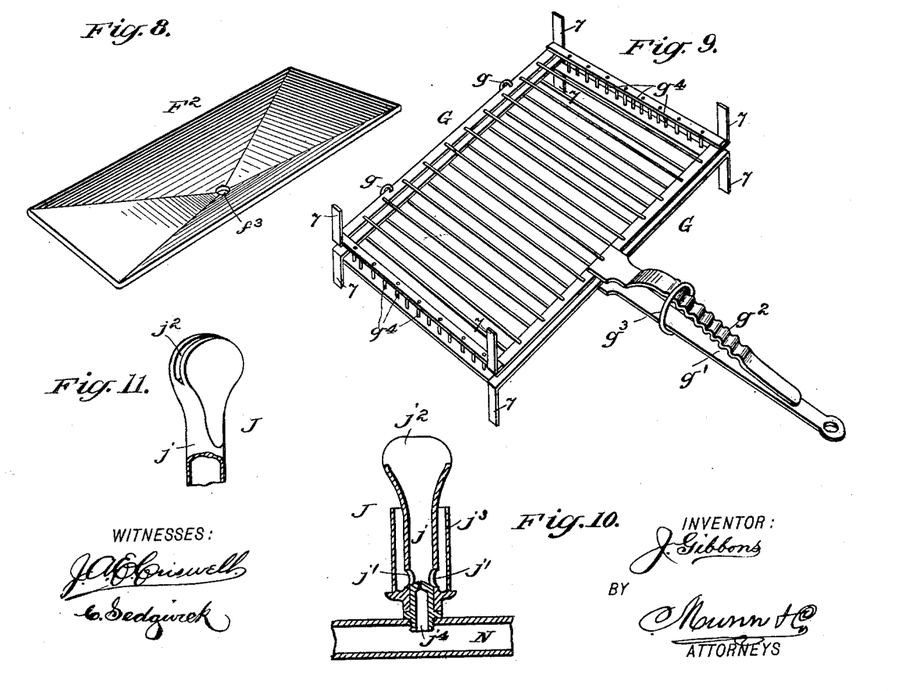
Fig. 8 is a top perspective view of the drip pan or funnel of the broiling-chamber.
Fig. 9 is a perspective view of the broiler-grid of the apparatus.
Fig. 10 is an enlarged vertical section through one of the preferred gas-burners of the apparatus and a part of the gas or fluid fuel supply pipe.
Fig. 11 is a perspective view of the upper end of the burner.
Figure 19:
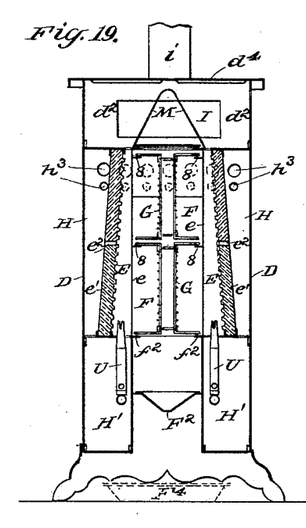
Fig. 19 is a front vertical section of a single broiler apparatus with two grids in the broiling-chamber, ordinary Bunsen burners being shown here also.

The grid G is most clearly shown in Fig. 9 of the drawings, and is made with two opposite skeleton bar or rod side frames, which are suitably hinged or coupled together at the rear edges by links $g$ or other hinges. One side or frame of the grid is provided with a handle-arm $g'$, which may be straight, or nearly so, and the other side or frame of the grid is provided with a handle-arm $g^2$, which at a point near the grid-frame is preferably made to bulge outward and then to gradually slope or incline inward toward the other handle-arm. This sloping or inclined part is preferably provided with lateral serrations or corrugations to prevent the clamp-ring device $g^3$ slipping forward on the two handle-arms. When the clamp-ring is engaged with the higher portion of the handle-arm $g^2$, as shown in the drawings, the two side frames of the grid will be held closer together to tightly hold a comparatively thin steak or substance between them; but when a thicker substance is to be broiled the grid-handle ring $g^3$ will be engaged with the outer sloping portion of the handle-arm $g^2$ to allow tight clamping of a thicker steak or substance between the grid-frames. I also prefer to provide the grid at top and bottom or opposite ends with detents which form guards to prevent the substance being broiled from falling out of the grid. These detents are shown as series of pins or studs $g^4$, set into or cast upon one or both opposite end parts of the grid and projecting across the space between its side frames. I also provide both side frames of the grid with outwardly-projecting lugs 7 7, two pairs of which at one end only of the grid would suffice; but I prefer to provide these lugs or lateral projections at both ends of the grid, which allow it to be reversed or turned end for end or upedge down in the broiling-chamber and be suspended by the lugs 7 7 at either end from opposing supports in the broiling-chamber, said supports being preferably opposing ribs or flanges 8 8, cast or otherwise produced on or at the opposite removable side walls $e\ e$ of the broiling-chamber. These supports 8 are preferably unbroken ribs or flanges extending far enough from front to rear of the cooking-walls $e\ e$ to form continuous rails, upon which the grid-lugs 7 may freely run backward and forward for most conveniently placing the grid into or removing it from the broiling-chamber. (See Fig. 2$^a$ of the drawings.) It will be understood that the ribs or flanges 8 may be substituted by any equivalent supports on which the grid may be sustained in the broiling-chamber, and that the grid is not necessarily provided with side lugs adapted to supports in the broiling-chamber, as other methods of supporting a grid in said chamber will readily suggest themselves. One large grid G may be used in the broiling-chamber F, as shown in Fig. 3, or two smaller grids may be used at once therein, as shown in Fig. 19 of the drawings.

I will now particularly explain some important features of construction of the fire-chambers E E of the broiler with regard to the use of fluid-fuel burners as a means of heating their opposing cooking-walls $e\ e$, and with more special reference to Figs. 2, 3, 6, and 7 of the drawings, as follows:

I have hereinbefore stated that the two opposing cooking-walls $e\ e$ of the contiguous fire-chambers E E are preferably made removable or renewable. These walls are set about vertical and parallel, and may be made either of thin cast metal or of sheet metal or of any metal alloy or other substance which will heat red hot or to incandescence by the use of any heat-producing medium burning behind them—fluid fuel or gas flaming from the burners J, for instance. I make these cooking-walls $e\ e$ thinner than the other walls of the fire-chambers and I set the rear walls $e'$ of the fire-chambers so that they lean inward toward the top or more closely approach the cooking-walls $e$ at that point. This inclination of the rear walls is important, as it contracts the fire-chambers at or toward their tops and confines thereat the products of combustion from the fluid-fuel burners to an extent that assures the heating or incandescence of the upper parts of the cooking-walls farthest removed from the burner-tips. In other words, the cooking-walls will be heated uniformly from top to bottom. It will be noticed that the inward leaning of the tops of the rear walls $e'\ e'$ of the contiguous fire-chambers E E, in connection with the location of the hot-product outlets $e^5$ of said chambers toward their fronts, assures a practical equalization of temperature of the entire surfaces of the cooking-walls and causes them to radiate heat evenly to the whole area of both side surfaces of the substance held between them in the grid G to quickly and uniformly broil the whole of said substance.

I prefer to make the back and opposite end walls of the fire-chambers E of fire brick or clay or other suitable refractory material which will be durable under the intense heat of the fluid-fuel burners J, and will give out sufficient heat to the air-superheating chamber or chambers behind them.

Fig. 2 of the drawings show the rear and both end fire-brick walls made in two parts or sections, and shows how the auxiliary superheated-air inlet $e^2$ to the fire-chambers is preferably formed as a slot produced partly in each of the two rear-wall bricks.

Figs. 6 and 7 most clearly show how the fire-brick linings are sustained by each other and the upper and lower plates D' D$^2$ and the vertical partition $h^2$.

The inward leaning or inclination of the rear walls $e'\ e'$ of the two opposing fire-chambers would alone retard in a measure the too free upward escape of hot products from the burners and would deflect the heat over toward the cooking-walls $e\ e$, and particularly at the contracted upper portions of the fire-chambers to equalize the heat radiation from the walls $e\ e$. I prefer, however, to vertically corrugate the inner faces of the rear fire-chamber walls $e'$ $e'$ by forming in them a series of lateral grooves which preferably range in approximately horizontal direction, as best seen in Figs. 2 and 3 of the drawings. These grooved or corrugated surfaces of the walls $e'$ would of themselves promote retardation of the hot products rising from the burners; but when inwardly-leaning rear walls of the fire-chambers are thus corrugated their heat-retarding effect is greatly increased. I prefer to also corrugate the inner faces of the rear walls $e'$ $e'$ by a series of vertical grooves, (best shown in Figs. 2 and 7 of the drawings,) to assist the retardation of the hot products rising from the burners and most effectively deflect or radiate the heat against the cooking-walls $e$ $e$ of the fire-chambers. The lateral grooves or vertical corrugation of the rear walls $e'$ are more important than their vertical grooves or horizontal corrugation for the purposes described. I again specially mention the comparative thinness of the adjacent cooking-walls $e$ $e$ of the two fire-chambers relatively to the thickness of the rear walls thereof, to allow quick and high heating of the cooking-walls by hot products flaming directly against them from the burners and deflected to them by the thicker outer walls of the fire-chambers. The refractory end walls of the fire-chambers may also be corrugated, if desired. It will be understood that the face corrugations of the rear walls of the fire-chambers may have any form or direction which will best retard the hot products rising from the fluid-fuel burners flaming into the fire-chambers.

The burners J, which I prefer to employ, are not in or of themselves claimed in this application, as they are substantially shown and described in a prior patent, No. 398,505, granted to me February 26, 1889. These burners are shown best in Figs. 2, 3, 7, 10, and 11 of the drawings, and are an improved form of Bunsen burner made with a central mixing tube or stem $j$, which has air-inlet apertures $j'$ near its lower end and has a wide thin split or aperture $j^2$ at its outer end, to assure a comparatively thin broad flame. The stem $j$ is surrounded at its lower part by a cup-casing $j^3$, which forms a chamber between the stem and casing, through which air must pass and in which the air will be superheated by the stem prior to entering it at its apertures $j'$ and passing to the point of ignition at $j^2$, with a proper quantity or volume of gas admitted through a nipple $j^4$, which is screwed into a gas-supply pipe N, which ranges from front to rear beneath each of the fire-chambers E E of the broiler. Four burners J are shown to heat up each of these fire-chambers, and the discharge or flame slits or apertures $j^2$ are arranged parallel with the opposite walls $e'$ $e'$ of the chambers, whereby the broad thin flames from all the burners will meet and extend practically from front to rear of said fire-chambers to most effectively and economically heat their opposing cooking-walls.

I specially mention the peculiar organization of this apparatus with contiguous fire-chambers whose opposing inner walls form cooking-walls of an intermediate boiling-chamber, primary air-superheating chambers being provided behind the fire-chambers, in connection with Bunsen burners having a cup-casing around their mixing and flame tube, which forms a secondary air-superheating chamber next the tube and in which air which has been once superheated in the main primary chamber next the fire-chamber is still more highly superheated before passing into the mixing-tube to commingle therein with the gas or fluid fuel. This successive superheating of the air in the secondary chambers of the burners after it has been first superheated in the primary chamber of the main casing assures a hotter flame from the burners for heating the cooking-walls and for superheating the air in the primary chambers than would otherwise be attainable.

Figure 12:
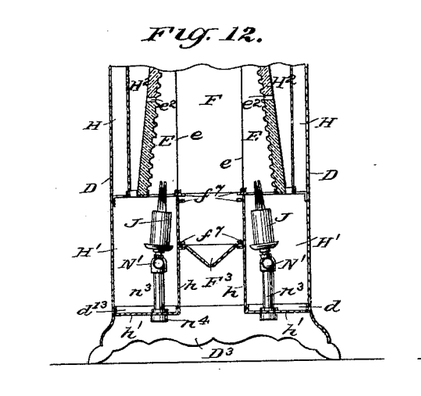
Figs. 12 and 13 are front and side sectional views of the broiler, illustrating a preferred construction of its base and connection of the burners therewith; also a modified form of drip-pan or funnel in the broiling-chamber.
Figure 13:
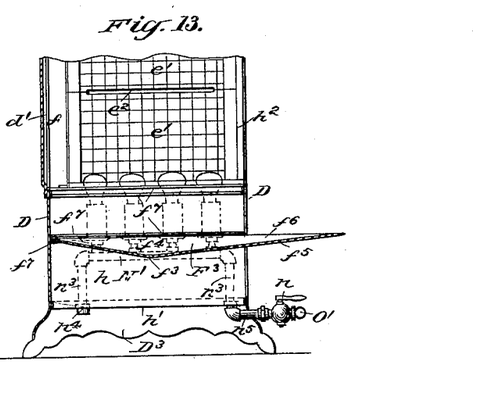
Figure 14:
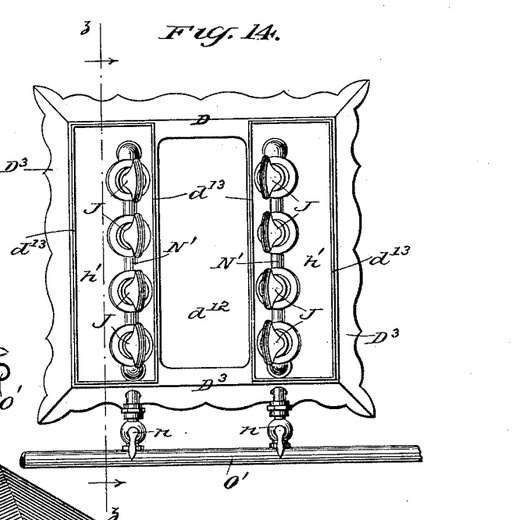
Fig. 14 is a plan view of the preferred base and burners thereon, drawn to a larger scale than in the two preceding views.
Figure 15:
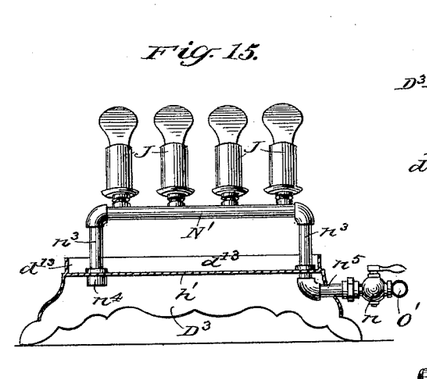
Fig. 15 is a sectional side view taken on the line $z\ z$ in Fig. 14.

Figs. 2, 3, and 7 of the drawings show the burners J fitted to gas-supply pipes N N, one ranging from front to rear of each of the lower compartments H' H' of the air-superheating chamber of the broiler. These supply-pipes are sustained at their front ends by the front wall of the casing D, through which they pass, while the rear ends of the pipes are closed by screw-caps $n'$, which abut the rear wall of the casing and are held thereto by screws $n^2$, passed through the casing from the outside into the caps. Suitable cocks or valves $n$ $n$ control feed of gas to the pipes N and the burners from a service-pipe O, which preferably ranges along the front of the casing D and may be extended laterally to either or both sides of the broiler to supply one or more extra broilers placed at one or both sides of the one shown. Doors $d^{11}$ $d^{11}$ are provided at the front of the casing D, one at each side of the broiling-chamber, and allow introduction of a match or taper to light the gas at the burners. Supporting the supply-pipes N N and their burners from the casing or frame D of the broiler, as above described, has disadvantages as regards convenience and cheapness of manufacture and adjustment of the parts of the broiler, which I purpose obviating by connecting the gas-supply pipes and burners only to the base of the broiler and as shown in Figs. 12, 13, 14, and 15 of the drawings, and next described. In this construction the bottom plates $h'$ $h'$ of the two lower parts H' H' of the air-superheating chamber H of the broiler are cast in one piece with the base-frame $D^3$, which has a central opening $d^{12}$, allowing drip from the grid to fall into the final receiver $F^4$ below the broiling-chamber. The legs of the broiler are also preferably cast upon or in one piece with the base-frame, upon which, around each bottom-plate portion $h'$, is cast an upwardly-projecting flange $d^{13}$, and upon or around these flanges the two opposite side parts of the upper casing or frame D are fitted and secured by bolts or otherwise to allow removal of the casing at pleasure for access to the burners. The burners J, of which four are shown for each fire-chamber, are in this case held to a pipe N', which has end drop-pipe fittings $n^3$ $n^3$, which are secured to the bottom plates $h'$ $h'$ of the respective air-superheating chambers. The rear fittings $n^3$ are closed at their lower ends by caps $n^4$, applied beneath the plates $h'$; but the front fittings $n^3$ are coupled to branch pipes or nipples $n^5$, which are provided with cut-off valves or cocks $n$, and are connected with a service-pipe O', which ranges along the front of the base and supplies both sets of burners J J of the broiler. Figs. 12, 14, and 15 of the drawings show that it may be preferable to incline the burners J a little toward the cooking-walls $e$ $e$ of the fire-chambers to give the burner-flames better effect in heating these walls, and Fig. 13 shows that the front extension $f^5$ $f^6$ of the drip-pan $F^3$ not only catches fat which drips from the grid, but it also guards the gas supply or service pipes O' $n^5$ from the drip, which the front ledge-plate shown in Fig. 2 of the drawings and placed below the gas-supply pipes will not do.

The construction of the two independent side cooking-chambers B B is shown in Figs. 1, 3, 4, and 5 of the drawings, and will be described as follows: Each chamber is made in box form, and preferably with a neat outer side wall $b$, and with two opposite or front and rear walls $b'$ $b'$, and a top wall or plate $b^2$. The chamber-walls may be made in one or more pieces of cast or sheet metal and may be fastened in any suitable manner to the side walls of the broiler-casing D, which thus form the inner walls or sides of the two auxiliary cooking-chambers B B, which, however, may have their own inner walls, if desired. The top of each chamber B is preferably provided with two holes, over which are placed the usual skeleton or spider frames $b^3$, onto which vessels containing water to be heated or foods to be boiled with water or other liquid will be placed.

A gas or fluid fuel supply pipe P branches upward from the common service-pipe O and extends along under each of the auxiliary cooking-chambers B B, and is provided with cocks or valves $p$ $p$, controlling supply of fluid fuel to burners R R, connected to the pipe, one under each of the spiders $b^3$. These burners are preferably improved Bunsen burners, like the ones J used in the broiler and hereinbefore described, except that they have a round-mouthed tube or stem $r$, from which the burner flames through the opening above it and directly onto the boiling or frying vessel which may be placed on the spider frame.

At or near the lower end of each of the auxiliary cooking-chambers B an opening or openings 9 is or are made in the casing D to establish communication between the adjacent air-superheating chamber H of the broiler and the interior of the chamber, and a suitable damper $b^4$ is provided to control passage of superheated air through the opening 9 from the chamber H to the one B or to prevent admission of air from one to the other at will. When the broiler is not in use and boiling or frying is done at either or both of the auxiliary cooking-chambers B B, the damper $b^4$ will be adjusted by operating its forwardly-extending stem $b^5$ to close the opening or openings 9 to prevent passage of hot air or gases from the auxiliary chamber in use to the air-superheating chamber H of the broiler; but when the broiler is in use the damper $b^4$ will be adjusted to open the passage or passages 9 leading to the auxiliary cooking-chamber it is desired to use, whereby some of the superheated air may pass from the broiler-chamber H into the chamber B and to the burners R to supply them with superheated air and increase their efficiency to a degree not possible should they be supplied only by atmospheric air admitted to the auxiliary cooking-chamber.

The oven C, which rests on top of the broiler A when baking is to be done, is made with double walls or an inner wall $c$, which forms the oven proper or baking-chamber, and an outer casing $c'$, which is open at the bottom or is bottomless, and rests by its lower strongly-wired edge directly upon the top plate $d^4$ of the broiler, from the openings $d^5$ of which the covers have been removed to allow hot products from the broiler-chamber $d^2$ to rise into the space $c^2$ between the chamber $c$ and casing $c'$ to quickly and thoroughly heat the baking-chamber, it being understood that when the oven is used a damper S, fitted in the pipe or flue $i$, will be closed, as shown in Fig. 2 of the drawings, to cut off outlet of hot products through the passage $d^3$, to which the flue-box I is fitted, and compel all the hot products escaping from the outlets $e^5$ of the two fire-chambers E E into the chamber $d^2$ of the broiler to pass through the passage $c^2$ between the oven-walls $c$ $c'$ on its way to the pipe $i$, which they enter through a short pipe or collar T, fitted to the oven-casing and the smoke-pipe. A partition $c^3$, fitted between the rear and side double walls of the oven, except at two points near the front of the oven, compels all the hot products to pass entirely around the space $c^2$ in the oven-walls to uniformly heat the baking-chamber $c$ before escaping at the outlet T into the waste-pipe. Suitable shelves $c^4$ are provided in the oven, a front door $c^5$ gives access to the baking-chamber, and handles $c^6$ $c^6$ at opposite sides allow convenient carriage and adjustment of the entire oven structure.

Figure 17:
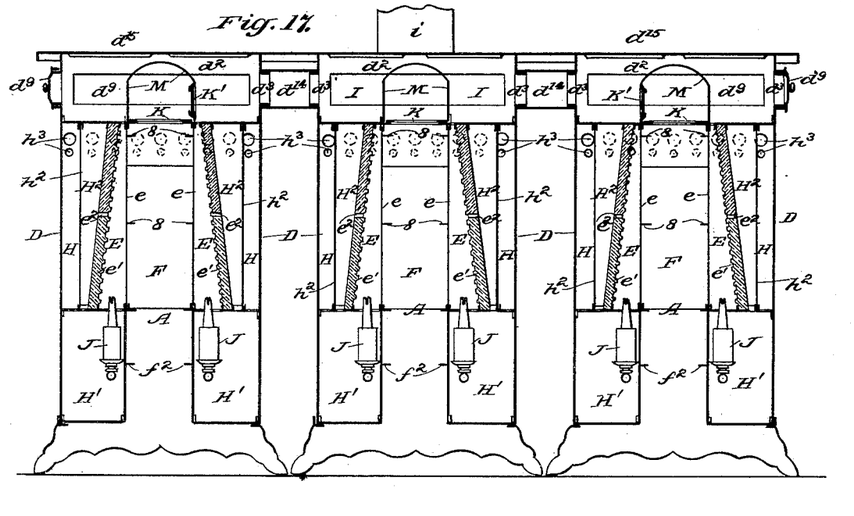
Fig. 17 illustrates diagrammatically, in front vertical section, how parts of my improved cooking apparatus may be arranged to form three independent broiling-chambers having outlet to one common flue.
Figure 18:
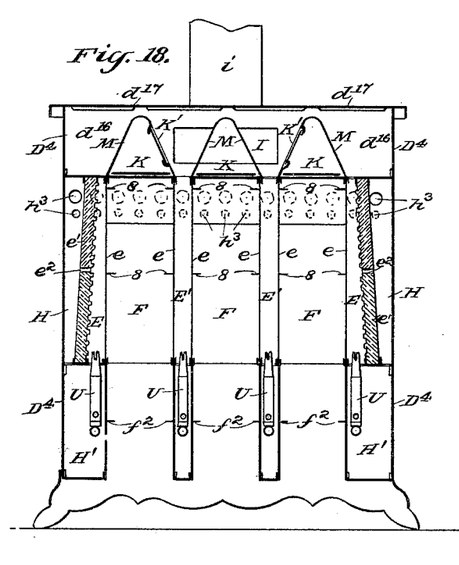
Fig. 18 illustrates in front vertical section another modification, showing how three broiling-chambers may be specially arranged with greater economy of space and with a less number of burners than in the construction shown in Fig. 12, ordinary Bunsen burners being here shown.

In view of the aforesaid general description a comparatively brief explanation of the modified cooking structures shown in Figs. 17, 18, and 19 will suffice.

Fig. 17 shows how three broilers A, each made substantially as above described, are placed side by side. The caps $d^9$ are set over the outer side and rear openings $d^3$ of the two outside broilers and are removed from adjacent or opposing openings $d^3$ of the three broilers, which are connected by the short pipe collars $d^{14}$. This coupling of the three broilers brings the upper hot-product chambers $d^2$ of all of them into communication, so that hot products from the opposing fire-chambers of all three broilers find an outlet into one common chamber and from a smoke-box I and pipe $i$, connected at the rear opening $d^3$ of the middle broiler. In this construction I purpose using one common top plate $d^{15}$, which is continuous over the hot-product chambers $d^2$ of all three broilers and will have a number of holes provided with lids to allow miscellaneous cooking by boiling or frying on the entire top of the apparatus; but the coupled broilers may each have an independent top plate, if desired. To lead the fumes from all three broiling-chambers to the common outlet I $i$, auxiliary dampers K' K' are fitted at the inner side walls of the caps or interior hoods M M of the two outside broilers.

In Fig. 18 of the drawings I show three broiling-chambers F F F, having thin opposing cooking-walls $e$ $e$, and all combined in one outer casing $D^4$ and heated by ordinary Bunsen burners U, flaming into the fire-chambers. In this construction the vertical partition or wall $h^2$ used in the broiler A, first described herein, is omitted, and there are but four fire-chambers to heat all three broilers. The two outside fire-chambers E E each have a rear wall $e'$, apertured at $e^2$ for inlet of superheated air from the chamber H, which also supplies superheated air directly to the burners to maintain combustion. The two intermediate fire-chambers E' E' are formed between the walls $e$ $e$ of adjacent broiling-chambers F, and the burners U, flaming into these inner fire-chambers E', will be more numerous or more powerful than those heating the two outer fire-chambers E, so as to heat the cooking-walls $e$ $e$ of two adjacent broiling-chambers F F. In this construction the upper hot-product chamber $d^{16}$ is continuous over the fire and broiling chambers and has a common outlet at I $i$ to a flue or chimney, and is provided with a top plate $d^{17}$, having holes and covers to allow boiling or frying on top of the apparatus. Extra dampers K' K' are used on the two end caps or interior hoods M M, which with the center cap allows discharge of fumes from all three broiling-chambers into the common smoke-flue I $i$.

In Fig. 19 is shown a single broiler, like the one A hereinbefore described, except that the interior wall or partition $h^2$ is not used. In this modified construction the atmospheric air enters at the holes $h^3$ into the chamber H and is superheated therein, and then for the most part passes downward into the lower combustion-chambers H', and thence rises past the burner-tips into the fire-chambers E, while a portion of the air superheated in the outer chamber H passes into the fire-chambers through the apertures $e^2$ in the walls $e'$ and beyond the points of ignition of the burners to assure perfect combustion, substantially as hereinbefore described, for the broiler having the partition-wall $h^2$. Ordinary Bunsen burners U are shown in the fire-chambers to heat the opposing cooking-walls $e$ $e$ for broiling substances placed in one or two grids G, sustained in the broiling-chamber F of the apparatus.

It will be noticed that in the preferred and modified constructions of the broiler its operation is substantially the same—that is to say, meats or fish of any kind cut or divided in the usual manner for cooking by broiling and placed in the grid or grids G, hung in the broiling-chamber F, between the opposing walls $e$ $e$ of the two contiguous fire-chambers, will be broiled evenly and thoroughly, eight to ten minutes only being required to broil the thickest beefsteak or mutton-chop, which is cooked through from both sides at once and so quickly that the juices are not allowed to escape with the fat drippings. The auxiliary side cooking-chambers B B are also most effective when supplied with superheated air coming through the side openings 9 of the broiler-casing to supply the Bunsen burners R, used in these chambers. The oven C, while being very similar in construction to other ovens or warming-chambers of like general character, is made very efficient and economical when combined with the improved broiler and utilizing as a heating agent the very hot gases passing from the fire-chambers of the broiler in the manner hereinbefore described. When the oven is removed from the broiler, an ordinary flat cake-griddle may be used on top of the broiler for baking wheat or other pan or griddle cakes, while meats or fish are being cooked in the broiling-chamber.

As regards certain novel useful combinations of parts of my invention, it is immaterial whether the opposing contiguous cooking walls or plates forming a broiling-chamber between them are the opposing inner walls of two independent contiguous fire-chambers or are simple plates to be heated in any approved manner to cook by radiation substances placed between them. I am also not limited to the use of fluid-fuel burners as sources of heat with certain combinations of elements of my invention, as will readily be understood.

The difference between a broiling and a roasting or baking operation is very material and quite differently-organized apparatus are required to effect these distinct operations. In broiling, very quick cooking of comparatively thinly-cut meats or other food products is necessary and directly over or near to very hot fires or surfaces, while roasting or baking, requiring a far longer time, is performed on comparatively thick or large joints of meat or loaves of bread or other substances. Hence in broiling food products at or from both sides at once two contiguous or quite closely set opposing and very hot fires or cooking-walls are necessary; but between such contiguous cooking-walls ordinary roasting or baking could not be performed without burning the outside of the food and leaving its interior uncooked, thereby spoiling it. For roasting or baking, the side walls of ordinary stove or range ovens are necessarily set much farther apart than the opposing cooking walls of the broiling-chamber of my apparatus, which are separated about from four to six inches, and stove-oven walls must not be heated to so high a temperature as the broiler cooking-walls. This relative difference in the sizes or widths of the broiling-chamber and baking or roasting oven, as also the higher temperature of the broiling-chamber side or cooking walls, will be manifest on inspection of Fig. 3 of the drawings.

I again remark that the making of the contiguous opposing cooking-walls of my apparatus readily removable from their supports in the casing or frame, to allow easy renewal of the walls when burned out by the fires or sources of heat, is an important feature of the invention.

I am not aware of any prior apparatus having readily removable cooking-walls, or such walls forming between them a broiling-chamber from which gases generated at or by the sources of heat are excluded to prevent contamination of the food being broiled in the chamber.

Another special feature of the invention consists in providing such readily removable opposing cooking-walls of the broiling-chamber with supports, such as ribs, ledges, or shoulders, on which one or more food-holding grids may be sustained in the chamber between the cooking-walls.

As regards some features of the invention, what is herein meant by "readily removable opposing cooking-walls of the broiling-chamber" is such walls not necessarily fitted to slide into and out from their supports, but cooking-walls or plates which may be readily removed for renewal of them without disorganizing, cutting, damaging, or destroying adjacent parts of the apparatus.

I do not herein broadly claim the two contiguous fire-chambers forming between them a broiling-chamber having substantially imperforate opposing contiguous cooking-walls and surmounted by an upper chamber receiving and giving outlet to the hot products of the fire-chambers, as these features are shown and claimed in another pending or concurrent application, filed May 10, 1890, by George Noakes and James Gibbons, Serial No. 351,243. Hence this application claims these features as modified by my later improvements providing for easy and quick removal of the contiguous opposing cooking-walls or plates of the broiling-chamber, and also providing for superheating of the air which maintains combustion in the fire-chambers and whereby increased convenience, economy, and safety in operating the apparatus are assured.

The above-named joint and concurrent application also shows and claims a series of broiling-chambers arranged alternately with a series of contiguous fire-chambers and beneath a common hot-product chamber. Hence this construction is claimed herein only in combination with later improvements providing for the important addition of the air-superheating feature or function relatively with the sources of heat in the fire-chambers of this multiple broiling-chamber apparatus.

Neither do I broadly claim herein the construction of the broiler-grid G in or of itself as a new article of manufacture, as by requirement of the Patent Office these claims are set forth in a pending concurrent divisional application filed by me for this grid device September 13, 1890, Serial No. 364,818. The general claim herein made for the grid is therefore limited to the combination of it with the peculiarly-arranged cooking-walls of the broiling-chamber, whereby it is sustained centrally between them in proper operative position.

The term "imperforate" as herein applied to the removable cooking-walls of the broiling-chamber is not to be construed in its strictest sense, but is to be considered as meaning substantially imperforate, so as not to allow passage of injurious gases from the sources of heat through them into the broiling-chamber upon the food.

Having thus described my invention, what I claim as new, and desire to secure by Letters Patent, is—

1. A cooking apparatus made with a broiling-chamber having opposing contiguous readily-removable cooking-walls, substantially as described.

2. A cooking apparatus made with a broiling-chamber having opposing, contiguous, readily-removable, and imperforate cooking-walls and sources of heat behind said walls, substantially as described.

3. A cooking apparatus made with a broiling-chamber having opposing contiguous readily-removable cooking-walls provided within the chamber with supports for food-holding grids, substantially as described.

4. A cooking apparatus made with a broiling-chamber having opposing, contiguous, readily-removable, and imperforate cooking-walls provided within the chamber with supports for food-holding grids, sources of heat being arranged behind said cooking-walls, substantially as described.

5. A cooking apparatus made with a casing or frame, opposing, contiguous, and removable cooking-walls sliding therein and forming a broiling-chamber between them, and sources of heat next said cooking-walls, substantially as described.

6. A cooking apparatus made with two contiguous fire-chambers having thin opposing walls which are readily removable from their supports and form cooking-walls of an intermediate broiling-chamber, and sources of heat within the fire-chambers, said fire-chambers having refractory heat-deflecting outer walls, substantially as described.

7. A cooking apparatus made with two contiguous fire-chambers forming a broiling-chamber between their opposing inner cooking-walls, said fire-chambers being contracted toward their tops, substantially as described.

8. A cooking apparatus made with two contiguous fire-chambers forming a broiling-chamber between their opposing inner cooking-walls which are substantially vertical and parallel, said fire-chambers having rear walls which lean inward and contract them toward their tops and throw the heat against the inner cooking-walls, substantially as described.

9. A cooking apparatus made with two contiguous fire-chambers forming a broiling-chamber between their opposing inner cooking-walls which are thinner than their outer walls, said outer walls being set to contract the fire-chambers toward their tops and throw the heat against the cooking-walls, substantially as described.

10. A cooking apparatus made with two contiguous fire-chambers forming a broiling-chamber between their opposing cooking-walls, the hot-product outlets of the fire-chambers being located toward the front entrance of the broiling-chamber, substantially as described, whereby the opposing cooking-walls of the fire-chambers will be evenly heated for their entire width, as set forth.

11. A cooking apparatus made with an outer casing or frame, two contiguous fire-chambers in said casing and having opposing cooking-walls forming a broiling-chamber between them, said casing also having an upper chamber receiving and leading off hot products from both fire-chambers, the broiling-chamber having an apertured upper portion forming an outlet, and a damper fitted thereto and controlling escape of smoke, heat, and odors from the broiling-chamber to the upper chamber, substantially as described.

12. A cooking apparatus made with an outer casing or frame, two contiguous fire-chambers in the casing and forming a broiling-chamber between them, said casing having another chamber receiving and leading off the hot products of both fire-chambers, combined with an interior cap or hood placed in the hot-products chamber above the broiling-chamber and receiving the fumes therefrom and conducting them to the flue-outlet, said interior cap preventing the hot products of the fire-chambers from entering the broiling-chamber, substantially as described.

13. A cooking apparatus made with an outer casing or frame, two contiguous fire-chambers in the casing and forming a broiling-chamber between them, said casing having another chamber receiving and leading off the hot products from both fire-chambers, combined with an interior cap or hood open at both ends and placed in the hot-products chamber above the broiling-chamber and receiving the fumes directly therefrom and conducting them to the flue-outlet, and a front fume-collecting hood communicating with the interior cap or hood which traverses the hot-products chamber, substantially as described.

14. A cooking apparatus made with two contiguous fire-chambers having opposing cooking-walls forming a broiling-chamber between them, the back or outer walls of said fire-chambers having facial corrugations which retard passage of hot products through the fire-chambers, substantially as described.

15. A cooking apparatus made with two contiguous fire-chambers having opposing cooking-walls forming a broiling-chamber between them, the back or outer walls of the fire-chambers leaning inward to contract said chambers toward their tops, said outer leaning walls having facial corrugations which retard passage of hot products through the fire-chambers, substantially as described.

16. A cooking apparatus made with contiguous opposing cooking-walls, forming between them a vertical broiling-chamber, and sources of heat behind said walls, the broiling-chamber having a downward extension provided at its side walls with ledges or shoulders, combined with a removable drip tray or funnel on said shoulders, practically closing the bottom of the broiling-chamber, substantially as described.

17. A cooking apparatus made with a vertical broiling-chamber having a downward extension provided at its side walls with ledges or shoulders, combined with a removable drip tray or funnel held between said shoulders and provided with a front extension beyond the broiling-chamber, said shoulders preventing tipping of the drip tray or funnel by weight or pressure on its extended front portion, substantially as described.

18. A cooking apparatus made with two contiguous fire-chambers having opposing inner cooking-walls forming a broiling-chamber between them, an outer casing forming an air-superheating chamber behind each fire-chamber, each superheating-chamber having openings admitting atmospheric air and other openings discharging said air when superheated into the fire-chambers to maintain combustion therein, substantially as described.

19. A cooking apparatus made with two contiguous fire-chambers having opposing inner cooking-walls forming a broiling-chamber between them, fluid-fuel burners flaming into said fire-chambers, an outer casing forming an air-superheating chamber behind each fire-chamber, and each superheating-chamber having openings admitting atmospheric air and other openings discharging said air when superheated into the fire-chambers to maintain combustion at the burners, substantially as described.

20. A cooking apparatus made with an outer casing or frame, two contiguous fire-chambers therein having inner cooking-walls forming a broiling-chamber between them, said casing having an upper chamber receiving the hot products of both fire-chambers and also forming an air-superheating chamber behind each fire-chamber and provided with openings admitting atmospheric air to the superheating-chambers, and the fire-chambers having other openings admitting superheated air to maintain combustion therein, substantially as described.

21. A cooking apparatus made with an outer casing or frame, two contiguous fire-chambers therein having opposing inner cooking-walls forming a broiling-chamber between them, fluid-fuel burners flaming into said fire-chambers, the casing having an upper chamber receiving the hot products from both fire-chambers, said casing also forming an air-superheating chamber behind each fire-chamber, and provided with openings admitting atmospheric air to the superheating-chambers, and the fire-chambers having other openings admitting superheated air to maintain combustion at the burners, substantially as described.

22. A cooking apparatus made with two contiguous fire-chambers having opposing inner cooking-walls forming a broiling-chamber between them, an outer casing forming an air-superheating chamber behind each fire-chamber, each of said air-superheating chambers provided with an intermediate wall or partition and bottom openings at each side of the partition and each fire-chamber having an opening through it beyond the burning fuel, substantially as described, whereby the air raised in temperature in the superheating-chambers will be discharged into the fire-chambers both at or adjacent to and beyond the fires to assure practically perfect combustion at a high temperature in the two opposing fire-chambers, as set forth.

23. In a cooking apparatus, the combination, with opposing contiguous cooking walls or plates forming a broiling-chamber between them and ledges or shoulders forming separate or independent supports on the respective cooking-walls within the chamber, of a grid having at its opposite side frames or parts outward lateral projections or extensions resting on the cooking-wall supports and sustaining it vertically within the broiling-chamber, substantially as described.

24. A cooking apparatus made with opposing readily-removable cooking walls or plates forming the inner sides of contiguous fire-chambers and providing a broiling-chamber between them, said removable cooking-walls provided, respectively, with separate or independent ledges or shoulders forming supports within the broiling-chambers, combined with a grid having at its opposite side frames or parts outward lateral projections or extensions resting on said cooking-wall supports and sustaining the grid vertically within the broiling-chamber, substantially as described.

25. A cooking apparatus made with two or more broiling-chambers and fire-chambers at both sides thereof, all arranged within an outer casing or frame and set back therefrom to form an air-superheating chamber or chambers next the fire-chambers, said casing provided with openings admitting atmospheric air, and the fire-chambers having other openings admitting the superheated air to maintain combustion, substantially as described.

26. A cooking apparatus made with two or more broiling-chambers and fire-chambers at both sides thereof, all arranged within an outer casing or frame and set back therefrom to form an air-superheating chamber or chambers next the fire-chambers, said casing provided also with openings admitting atmospheric air, and the fire-chambers having other openings admitting the superheated air to maintain combustion, said casing also having an upper or outer chamber into which the hot products of all the fire-chambers discharge to find outlet and upon the top of which upper chamber cooking may be done, substantially as described.

27. A cooking apparatus made with two contiguous fire-chambers having opposing inner cooking-walls forming a broiling-chamber between them, an outer casing forming an air-superheating chamber behind the fire-chambers and having openings admitting atmospheric air and other openings discharging said air when superheated into the fire-chambers to maintain combustion therein, and an auxiliary cooking-chamber at one or both sides of the broiler-casing and provided with a source of heat, said casing having openings discharging superheated air into the auxiliary cooking chamber or chambers to maintain combustion therein, substantially as described.

28. A cooking apparatus or broiler made with a casing or frame, contiguous opposing cooking-walls therein, forming a broiling-chamber between them, sources of heat for said cooking-walls within the casing, said casing provided with side openings adapted for connection of an outlet flue or pipe, and caps adapted to close the disused side openings, substantially as described, whereby two or more of the broilers may be coupled together and discharge their hot products at one flue, as set forth.

29. A cooking apparatus or broiler made with a casing or frame, two contiguous fire-chambers therein having opposing inner cooking-walls forming a broiling-chamber between them, the casing having an upper chamber receiving and carrying off the hot products from both fire-chambers, said casing provided at the hot-products chamber with side openings adapted for connection of an outlet flue or pipe, and caps adapted to close the disused side openings, substantially as described.

JAMES GIBBONS.

Witnesses:
HENRY L. GOODWIN,
EDGAR TATE.